United States Patent [19]
Kato et al.

[11] Patent Number: 5,784,878
[45] Date of Patent: Jul. 28, 1998

[54] IDLE SPEED CONTROL SYSTEM OF INTERNAL COMBUSTION ENGINE

[75] Inventors: Hiroaki Kato; Yuichi Shimasaki; Takashi Komatsuda; Akihisa Saito; Hiroaki Muramatsu; Takuya Aoki; Tetsu Teshirogi; Hideo Furumoto, all of Wako; Takayoshi Nakayama, Haga-machi, all of Japan

[73] Assignee: Honda Giken Kogyo Kabushiki Kaisha, Tokyo, Japan

[21] Appl. No.: 674,692

[22] Filed: Jul. 2, 1996

[30] Foreign Application Priority Data

Jul. 4, 1995 [JP] Japan ................. 7-191243

[51] Int. Cl.⁶ .................. F01N 3/20; F01N 3/30
[52] U.S. Cl. .................. 60/274; 60/285; 60/300; 123/339.18
[58] Field of Search ............... 123/339.16, 339.18, 123/339.22; 60/274, 276, 284, 285, 286, 300, 289

[56] References Cited

U.S. PATENT DOCUMENTS

| | | | |
|---|---|---|---|
| 4,766,862 | 8/1988 | Hibino et al. | 123/339.18 |
| 5,235,946 | 8/1993 | Fodale et al. | 123/339.22 |
| 5,321,231 | 6/1994 | Schmalzriedt et al. | 60/284 |
| 5,444,976 | 8/1995 | Gonze et al. | 60/286 |
| 5,447,696 | 9/1995 | Harada | 60/286 |
| 5,537,321 | 7/1996 | Yoshizaki et al. | 60/284 |
| 5,592,918 | 1/1997 | Suzuki et al. | 123/339.22 |

FOREIGN PATENT DOCUMENTS

| | | |
|---|---|---|
| 1-232246 | 9/1989 | Japan . |
| 2-24550 | 1/1990 | Japan . |
| 6-101459 | 4/1994 | Japan . |
| 7-174257 | 6/1995 | Japan . |

*Primary Examiner*—Willis R. Wolfe
*Attorney, Agent, or Firm*—Nikaido, Marmelstein, Murray & Oram LLP

[57] ABSTRACT

A system for controlling an idle speed of an internal combustion engine having an electrically heated catalytic converter which is heated up when current is supplied from an alternator driven by the engine. In the engine idle control, a basic value of a desired idle engine speed is determined with respect to the engine coolant temperature in the same manner as the prior art. However, an augmentative correction amount of the desired idle engine speed is determined with respect to the exhaust system ambient temperature. More specifically, the desired idle engine speed is increased in response to the heating of the catalytic converter so as to prevent the alternator from generating electric power insufficient for heating up the catalytic converter.

12 Claims, 7 Drawing Sheets

FIG.12

IDLE SPEED CONTROL SYSTEM OF INTERNAL COMBUSTION ENGINE

BACKGROUND OF THE INVENTION

1. Field of the Invention

This invention relates to a system and a method for controlling the idle speed of an internal combustion engine, and more particularly to a system and a method for controlling the idle speed of an internal combustion engine having an electrically heated catalytic converter at its exhaust system.

2. Description of the Related Art

An internal combustion engine usually has a three-way catalytic converter in the exhaust system which reduces all three types of CO, HC, and NOx emissions that escape through the exhaust system, and which removes pollutants from the exhaust gases in the engine exhaust system. However, the catalyst is ineffective or inactive until its temperature has risen to a high temperature. It takes a long time until the catalytic converter has heated up to the necessary temperature from, for example, cold engine starting. For that reason, a catalytic converter having an electric heater that heats the catalyst to promote the activation is nowadays used.

The electrically heated catalytic converter is configured to have an electric heater in the vicinity of a carrier that carries a catalyst or to have such a carrier that is inherently manufactured as an electric heater. The heater is supplied with current and heats up by resistance heating. The heater thus supplied with current burns off the unburned exhaust gases generated by the engine and passing through the engine exhaust to promote the activation of the catalytic converter itself and other ordinary catalytic converter(s) installed downstream thereof.

The electrically heated catalytic converter is supplied with electric power by a battery or an alternator mounted on the vehicle. When current is supplied to the catalytic converter heater during engine idle speed control, since the power consumption of the catalytic converter heater is relative large, it becomes sometimes impossible to supply the required electric power. For that reason, Japanese Laid-Open Patent Application 6-101,459 teaches raising the engine idle speed, when the catalytic converter heater is supplied with current, so as to prevent the electric power from being insufficient.

In the engine idle speed controls including this prior art system, the idle speed is usually determined based mainly on the engine coolant temperature. Since the heat capacity of the engine is naturally greater than that of the engine exhaust system, in a situation where the engine ran and then was once stopped, but is restarted within a short time and in some similar situations, the exhaust system temperature becomes low which necessitates supplying the current to the catalytic converter heater, while the engine coolant still remains at a high temperature.

In this situation, the desired engine idle speed is basically determined in the prior art in accordance with the engine coolant temperature as mentioned earlier and is therefore determined to be a relatively low speed due to the high engine coolant temperature. As a result, the speed, even though raised as taught by the prior art, is still insufficient for generating the required power since the basic idle speed itself is set to be low. In other words, the prior art system does not teach determining the increase of the engine idle speed taking the exhaust system ambient temperature into account.

An object of the invention is therefore to solve the drawback of the prior art and to provide a system and a method for controlling an idle speed of an internal combustion engine, which makes it possible to generate the electric power required in various engine idle situations including engine restarting after a short stop, by taking the engine exhaust system ambient temperature into account for determining the increase of the idle speed.

SUMMARY OF THE INVENTION

In order to achieve the object, the present invention provides a system for controlling an idle speed of an internal combustion engine, comprising a catalytic converter installed in an exhaust system of the engine for reducing pollutants from exhaust gases emitted from the engine, the catalytic converter having a heater, a current supply circuit for supplying current to the heater of the catalytic converter, idling operation detecting means for detecting whether the engine is in an idling state, engine coolant temperature detecting means for detecting an engine coolant temperature of the engine, exhaust system ambient temperature detecting means for detecting an ambient temperature of the exhaust system of the engine, desired idle speed determining means for determining a desired idle speed of the engine with respect to at least the engine coolant temperature when the engine is in the idling state, desired idle speed increasing means for determining an augmentative correction amount in response to the exhaust system ambient temperature to increase the desired idle speed when the heater of the catalytic converter is supplied with current, and engine speed control means for controlling a speed of the engine to the desired idle speed.

BRIEF DESCRIPTION OF THE DRAWINGS

The above and other objects and advantages of the invention will be more apparent from the following description and drawings, in which.

DESCRIPTION OF THE PREFERRED EMBODIMENTS

Embodiments of the invention, given by way of example only, will now be explained with reference to the drawings.

Figure 1:
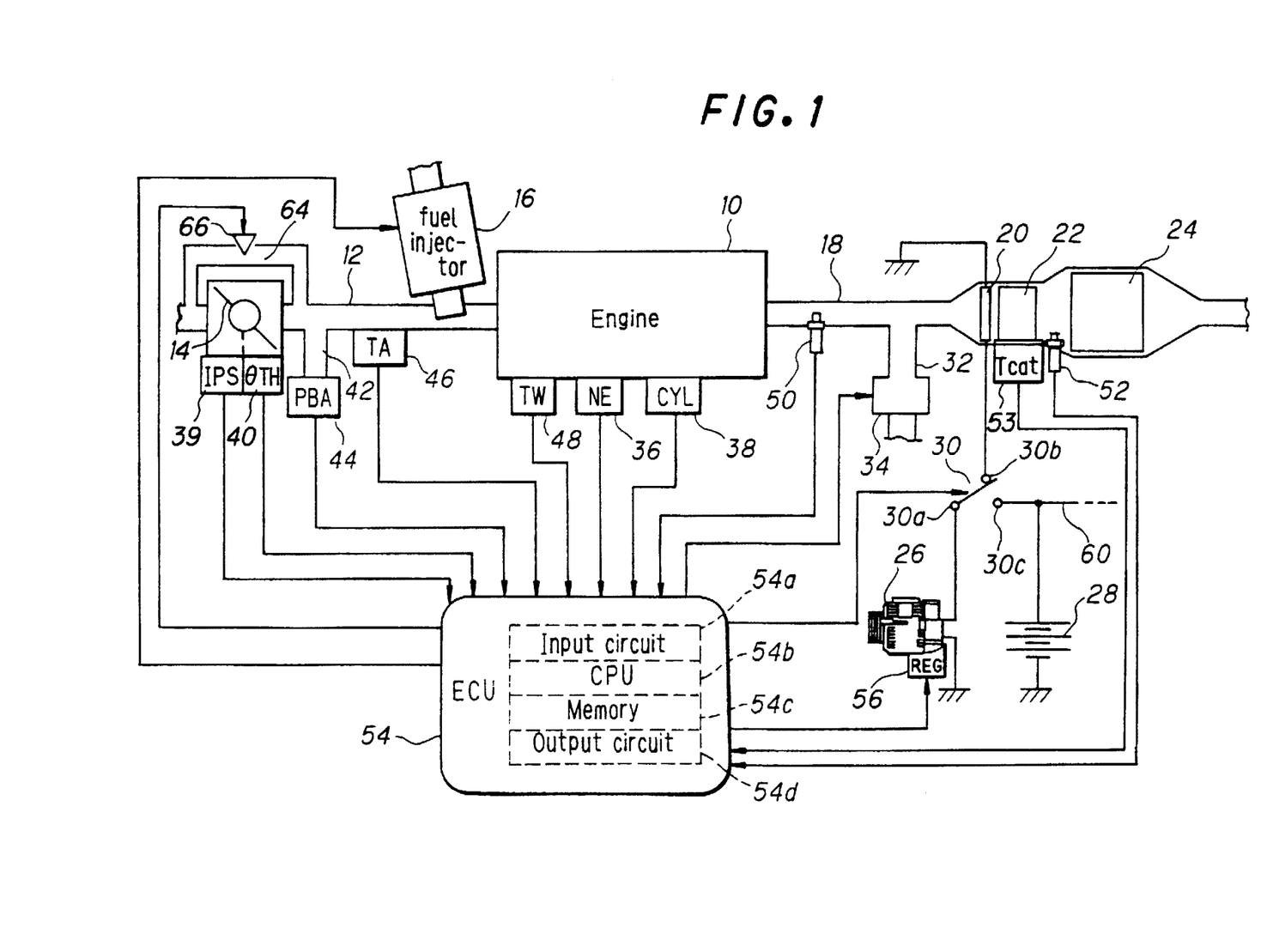
FIG. 1 is an overall schematic view showing a system for controlling an idle speed of an internal combustion engine according to the invention.

FIG. 1 is an overall schematic view showing a system for controlling an idle speed of an internal combustion engine according to the invention.

Reference numeral 10 in this figure designates a multi-cylinder engine such as a four-cylinder internal combustion engine. Air drawn into an air intake pipe 12 through an air cleaner (not shown) mounted on a far end thereof is supplied to each of the first to fourth cylinders through a surge tank and an intake manifold (neither shown), while the flow thereof is adjusted by a throttle valve 14 provided in the air intake pipe 12. A fuel injector 16 for injecting fuel is installed in the vicinity of intake valves (not shown) of each cylinder of the engine. The injected fuel mixes with the intake air to form an air-fuel mixture that is ignited in the associated cylinder by a spark plug (not shown). The resulting combustion of the air-fuel mixture drives a piston (not shown) down.

The exhaust gas produced by the combustion is discharged through exhaust valves and an exhaust manifold (neither shown) to an exhaust pipe 18. The exhaust pipe 18 is installed with, in order from the upstream side (in terms of exhaust gas flow), the aforesaid electrically heated catalytic converter (hereinafter referred to as "EHC") 20 having a heater (not expressly shown), a start catalytic converter 22 and a three-way catalytic converter 24, which burn off the remaining HC, CO, and NOx emissions in the exhaust gases which escape from the cylinders thus reducing pollutants in the exhaust gases from the engine exhaust system. The start catalytic converter 22 (known as a "light-off catalyst") is configured to have a relatively small diameter and volume and is provided in particular for enhancing catalyst conversion efficiency immediately after engine starting.

The body of the EHC 20, i.e., a carrier that carries the catalyst, is made of a metal mesh. The metal mesh is manufactured by extruding metallic materials, then by sintering them to a ceramic bar, and then by cutting the bar into disc-shaped slices of 10 cm thickness. The metal mesh is provided with slits for a current supply path therebetween. Thus, the metal mesh itself is configured to be an electric heater. The current path has an anode and a cathode at opposite ends thereof.

As illustrated in the figure, an alternator 26 is provided in the vicinity of the engine 10. The alternator 26 is connected to the crankshaft (not shown) of the engine 10 and is driven to produce electric power. The generated electric energy is supplied to the EHC 20 or a battery 28. More specifically, a switch 30 is inserted in the current supply circuit. When terminals 30a and 30b are connected, the anode of the metal mesh (heater) of the EHC 20 is connected with the alternator 26 to be supplied with current for heating up. As a result, the heated EHC 20 burns off the remaining emissions generated immediately after the engine starting. The EHC 20 further heats up with the heat generated by the chemical reaction of the burning and promptly reaches the activation temperature, thereby promoting the start catalytic converter 22 and the three-way catalytic converter 24 installed downstream thereof to activate.

The exhaust pipe 18 is connected with a conduit 32 which has an air pump 34 at the opposite end for supplying secondary air. Since a large amount of unburned gases are produced at engine starting, the air pump 34 is installed to supply air to the exhaust pipe 18 to promote burning, thereby enhancing conversion efficiency of the catalysts.

A crankshaft position sensor 36, illustrated as "NE" in the figure, is provided on the camshaft or crankshaft (neither shown) which produces a signal once per predetermined crank angular position. A camshaft position sensor 38, illustrated as "CYL" in the figure, is similarly provided on the camshaft (not shown) which produces a signal at a prescribed crank angular position of the first cylinder. An idle position switch 39, illustrated as "IPS" in the figure, is provided to the throttle valve 14 to detect, and to generate an ON signal when the throttle valve is almost fully closed. Similarly, a throttle position sensor 40, illustrated as "θTH" in the figure, is connected to the throttle valve 14 to detect, and to generate a signal indicative of, the degree of opening of the throttle valve 14.

The air intake pipe 12 is branched off downstream of the position where the throttle valve 14 is placed, to have a branch 42. A manifold absolute pressure sensor 44, illustrated as "PBA" in the figure, is installed at the far end of the branch 42, to detect, and to generate a signal indicative of, the intake manifold pressure downstream of the throttle valve 14 in terms of absolute pressure.

In addition, the air intake pipe 12 is provided with an intake air temperature sensor 46, illustrated as "TA" in the figure, for detecting, and for generating a signal indicative of, the temperature of the intake air; and an engine coolant temperature sensor 48, illustrated as "TW" in the figure, for detecting, and for generating a signal indicative of, the temperature of the engine coolant is provided at a suitable location on the engine 10.

On the other hand, the exhaust pipe 18 is provided with, upstream of the intersection where the conduit 32 is connected, a first oxygen sensor 50 comprising an $O_2$ sensor for detecting, and for generating a signal indicative of, the oxygen content in the exhaust gases. The exhaust pipe 18 is further provided with a second oxygen sensor 52 similarly comprising an $O_2$ sensor, at a position between the start catalytic converter 22 and the three-way catalytic converter 24. A temperature sensor 53, illustrated as "Tcat" in the figure, is provided in the proximity of the second $O_2$ sensor 52 to detect, and for generating a signal indicative of, the exhaust system ambient temperature.

The first and second $O_2$ sensors are respectively provided with a heater which heats up a detection element comprised of a special ceramic core, upon receipt of current from current supply circuits (neither shown). Since the structure and configuration of the $O_2$ sensors of this kind are known from prior art references such as Japanese Laid-Open Patent Application Nos. Hei 1(1989)-232,246 and Hei 2(1990)24, 550, no further explanation thereof will be made.

The signals outputted from the sensors are sent to a control unit 54 that is illustrated as "ECU" in the figure.

The ECU 54 comprises a microcomputer made up of an input circuit 54a, a CPU 54b, a memory 54c and an output circuit 54d. The input circuit 54a carries out various procedures including shaping some sensor signal waveforms, converting some sensor signals to predetermined levels in voltage, and converting some analog sensor signals into digital values. The memory 54c stores various data including calculation programs and the results of the calculations in response to the instructions made by the CPU 54b.

The CPU 54b operates, via the switch 30, to connect the alternator 26 to the EHC 20 to supply current thereto in response to the detected parameters. The alternator 26 has a regulator 56. The CPU 54b determines and outputs a pulse train indicative of a duty cycle in a pulse-width modulation control such that the alternator 26 produces the electric power at a level determined by the duty cycle.

In the switch 30, on the other hand, when the terminal 30a is switched to connect with the terminal 30c, the alternator 26 is connected with the battery 28 to charge it. The battery 28 is connected, through a line 60, to various electric loads including an electric motor (not shown) of the air pump 34. The CPU 54b controls the operation of the air pump 34 by controlling the operation of the motor, and controls fuel metering through the fuel injector 16.

In the air intake side in the figure, the air intake pipe 12 is provided with a secondary air intake pipe 64 which bypasses the location where the throttle valve 14 is placed. An electro-magnetic valve 66 is provided to open/close the secondary air intake pipe 12. The CPU 54b controls the engine speed to a desired idle speed by regulating the amount of air passing through the secondary air intake pipe 64 by generating and supplying pulse trains of the pulse-width modulation to a driver circuit of the electro-magnetic valve 66 that determines the amount of lifting or stroke of the valve 66.

Figure 2:
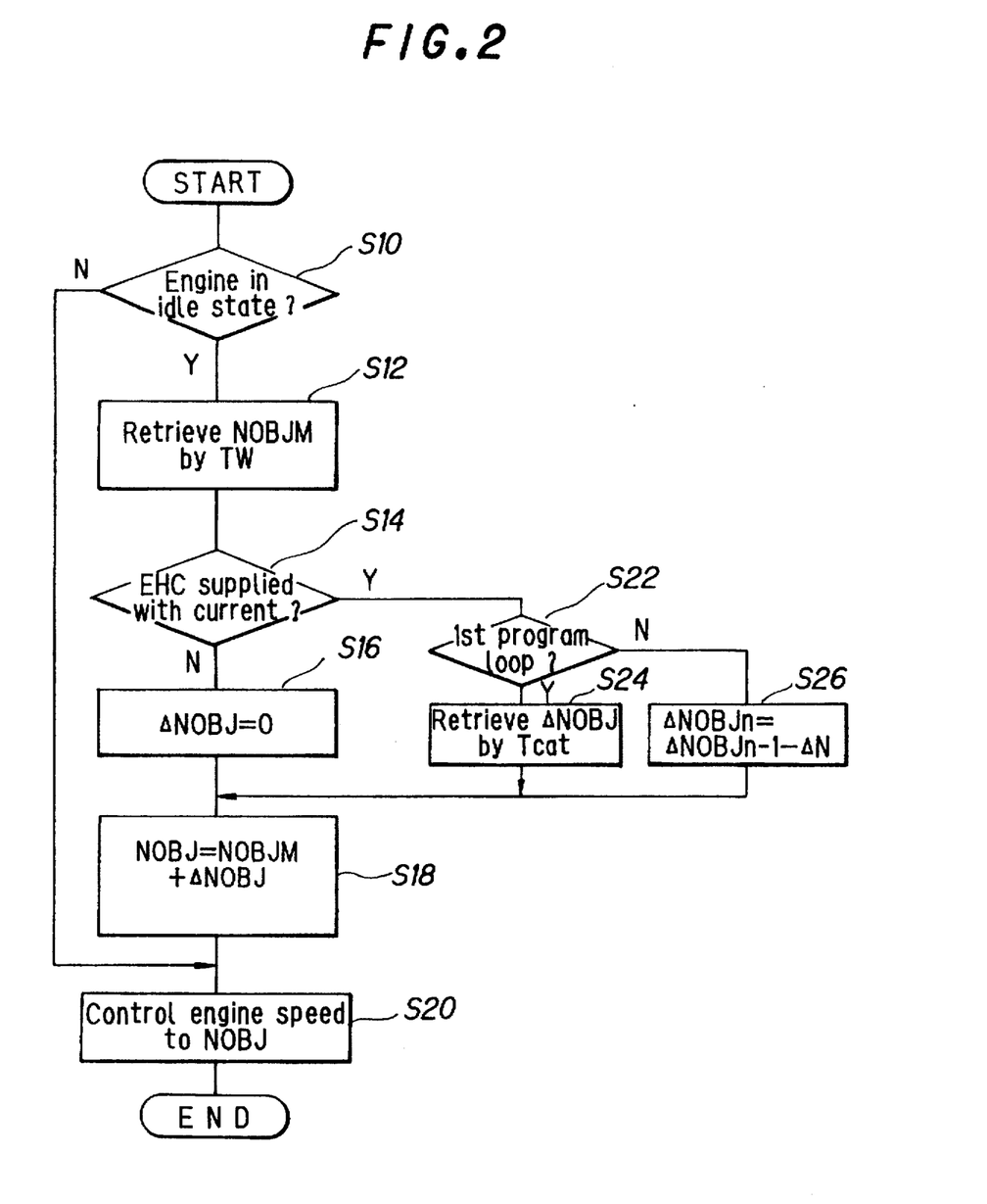
FIG. 2 is a flowchart showing the operation of the system illustrated in FIG. 1.

FIG. 2 is a flowchart showing the operation of the system according to the invention. The program disclosed here is looped at a predetermined interval Tp.

Explaining this, the program starts at S10 in which it is checked whether the engine is in an idle state. Specifically, it is determined to be in the idle state when the idle position switch 39 generates the ON signal (throttle closed), the engine speed is at or below a predetermined speed and the engine load is not more than a predetermined load.

Figure 3:
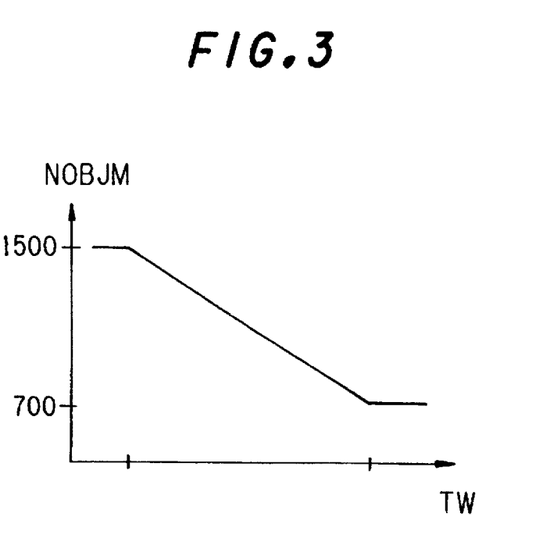
FIG. 3 is a graph showing the characteristics of a basic value NOBJM of a desired idle speed established with respect to the engine coolant temperature and referred to in the flowchart of FIG. 2.

When the result in S10 is affirmative, the program proceeds to S12 in which a basic value NOBJM is determined. This is a basic value of the desired engine speed of the idle control. FIG. 3 illustrates the characteristics of the basic value NOBJM of the desired engine speed determined with respect to the engine coolant temperature TW. The characteristics are stored as a table in the memory 54c to be retrievable by the detected engine coolant temperature TW. As illustrated, the characteristics are determined such that the basic engine speed NOBJM decreases with increasing engine coolant temperature TW. This is because the engine idle speed control also serves to warm up the engine.

The program then goes to S14 in which it is checked whether the EHC 20 is in the heating operation, i.e., if the EHC heater is supplied with current. This is conducted by checking an appropriate flag used in the current supply control to the EHC heater.

Figure 4:
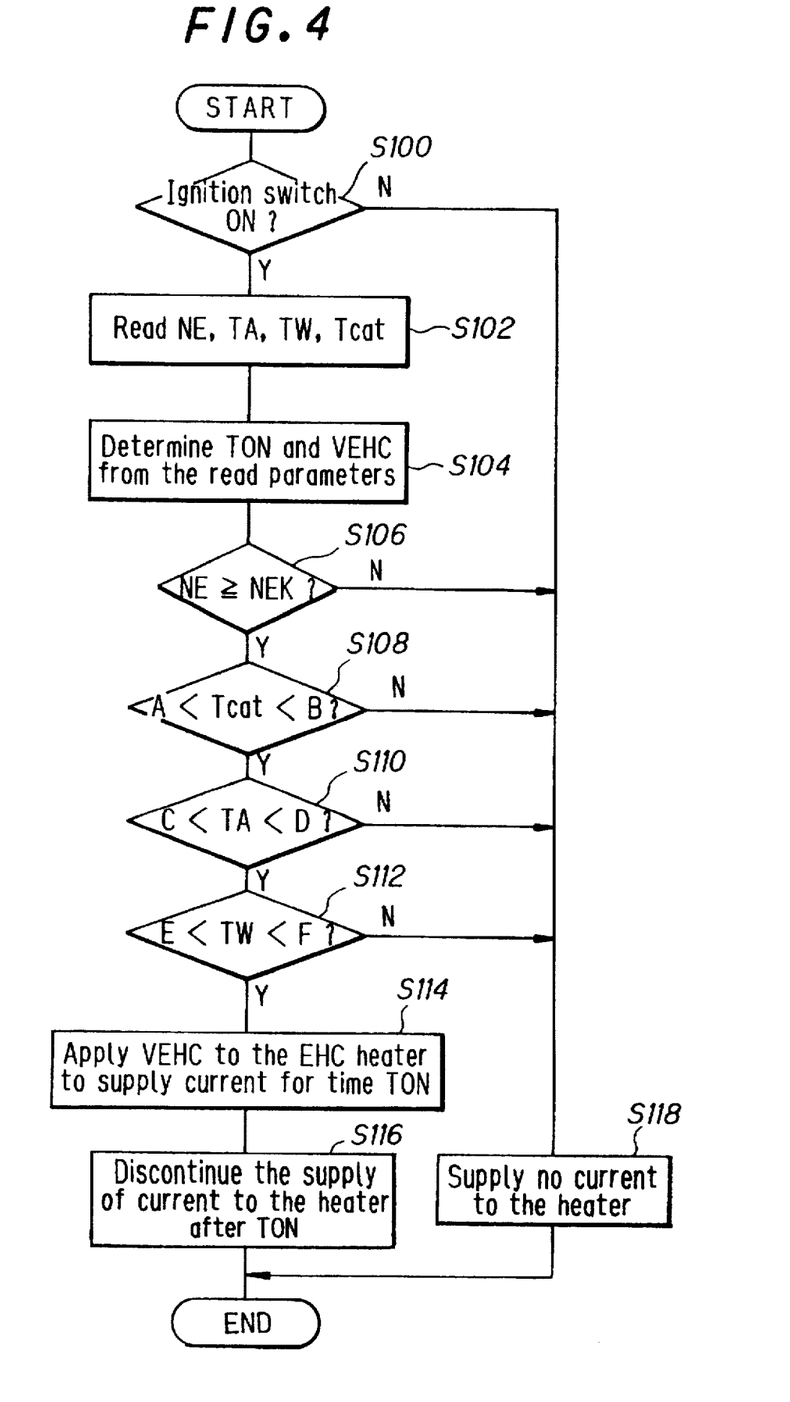
FIG. 4 is a flowchart showing the current supply control referred to in the flowchart of FIG. 2.

Here, the current supply control to the EHC will be explained with reference to a flowchart shown in FIG. 4.

First, in S100, it is checked whether the ignition switch (not shown) is turned ON, more specifically if it is being turned ON and when the result is affirmative, the program proceeds to S102 in which various engine operating parameters including the engine speed NE, the intake air temperature TA, the engine coolant temperature TW, and the exhaust system ambient temperature Tcat are read. The program then goes to S104 in which the time TON during which the current is to be supplied to the EHC 20 and the voltage VEHC to be applied to the EHC 20 are determined. The voltage VEHC is determined to be, for example, 30 V at cold engine starting.

Figure 5:
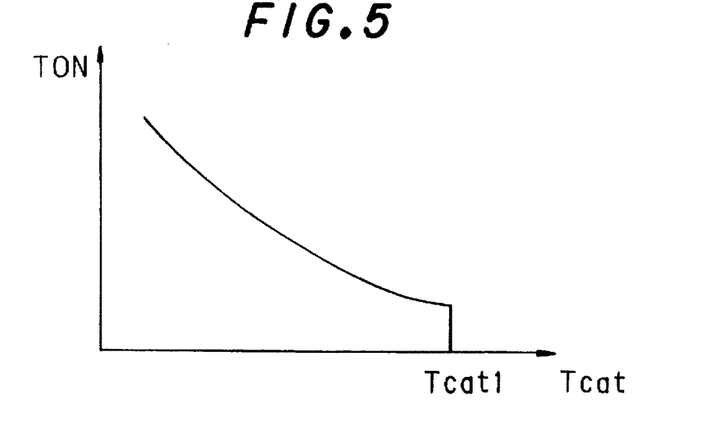
FIG. 5 is a graph showing the characteristics of the time TON during which current is supplied to the catalytic converter heater, determined with respect to the exhaust system ambient temperature Tcat and referred to in the flowchart of FIG. 4.
Figure 6:
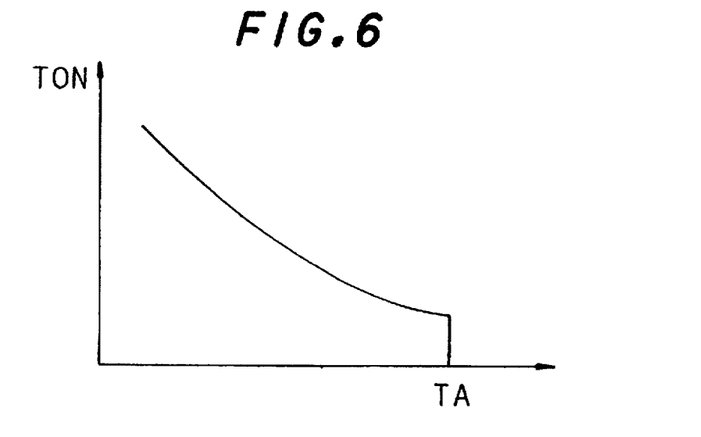
FIG. 6 is a graph showing the characteristics of the time TON during which current is supplied to the catalytic converter heater, determined with respect to the intake air temperature TA and referred to in the flowchart of FIG. 4.
Figure 7:
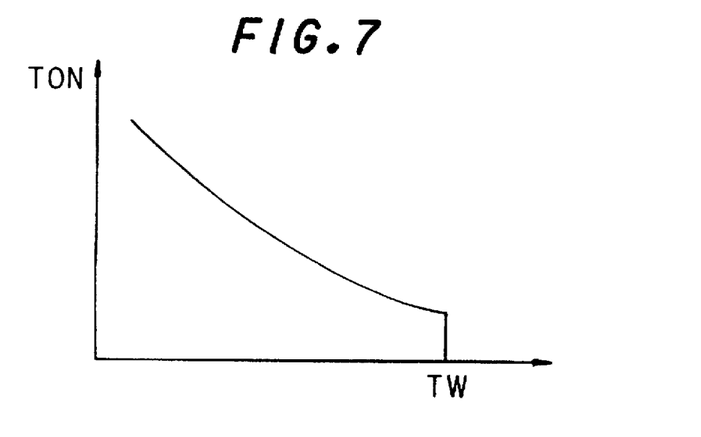
FIG. 7 is a graph showing the characteristics of the time TON during which current is supplied to the catalytic converter heater, determined with respect to the engine coolant temperature TW and referred to in the flowchart of FIG. 4.
Figure 8:
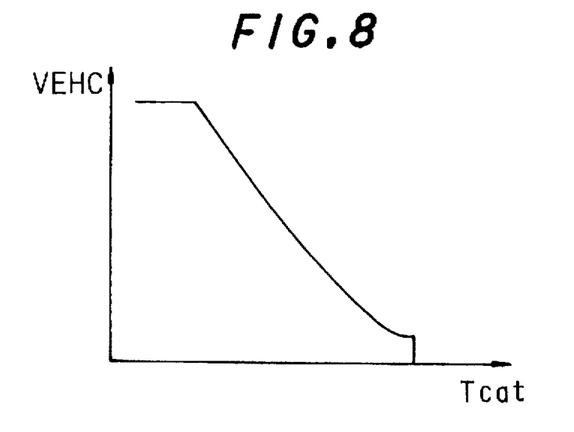
FIG. 8 is a graph showing the characteristics of the voltage VEHC to be applied to the catalytic converter heater, determined with respect to the exhaust system ambient temperature Tcat and referred to in the flowchart of FIG. 4.
Figure 9:
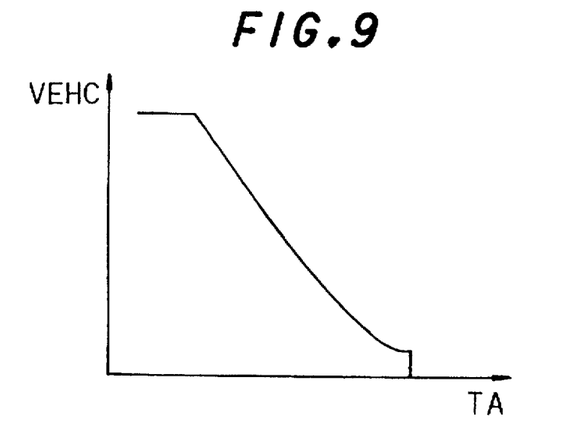
FIG. 9 is a graph showing the characteristics of the voltage VEHC to be applied to the catalytic converter heater, determined with respect to the intake air temperature TA and referred to in the flowchart of FIG. 4.
Figure 10:
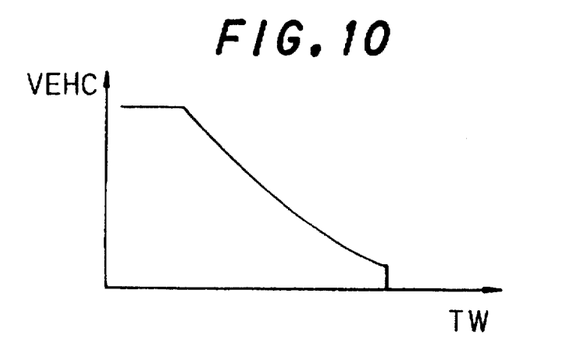
FIG. 10 is a graph showing the characteristics of the voltage VEHC to be applied to the catalytic converter heater, determined with respect to the engine coolant temperature TW and referred to in the flowchart of FIG. 4.

It should be noted here that the current supply time TON is determined, as illustrated in FIGS. 5 to 7, such that it decreases with increasing exhaust system ambient temperature Tcat, with increasing intake air temperature TA, or with increasing engine coolant temperature TW. Similarly, as illustrated in FIGS. 8 to 10, the voltage VEHC is also determined to be less as these temperatures rise.

The program then proceeds to S106 in which it is checked whether the engine speed NE has reached a reference engine speed NEK indicating that the engine runs by itself, without the aid of a cranking motor. If the result is affirmative, the program goes to S108 and to S112 via S110 in which it is respectively determined whether the exhaust system ambient temperature Tcat, the intake air temperature TA and the engine coolant temperature TW are within a range defined between values A and B, C and D or E and F, respectively.

When the results in these steps are all affirmative, the program proceeds to S114 in which the alternator 26 is switched to be connected with the EHC 20 (via the terminals 30a, 30b) and the alternator 26 is controlled, through the regulator 56, to generate the determined voltage VEHC and apply the voltage to the heater of the EHC 20 to produce the current that passes through the EHC heater, while setting the bit of the above-mentioned flag to ON. The program then advances to S116 in which the time is measured and when it has reached the time TON, the terminal 30a is switched to connect with the other terminal 30c to open the circuit and discontinue the current supply to the EHC heater.

On the other hand, when the result in any of S100 and S106 to S112 is negative, the program goes to S118 in which the current supply to the EHC heater is not performed. Although not shown in the flowchart, the air pump 34 is controlled to provide compressed air in the exhaust pipe 18 simultaneously with the current supply to the EHC heater.

Again returning to the flowchart of FIG. 2, when the result of S14 is negative, in other words, it is found that the EHC heater is not supplied with current, the program advances to S16 in which an augmentative correction amount (correction for increasing speed) ΔNOBJ is determined to be zero.

Figure 11:
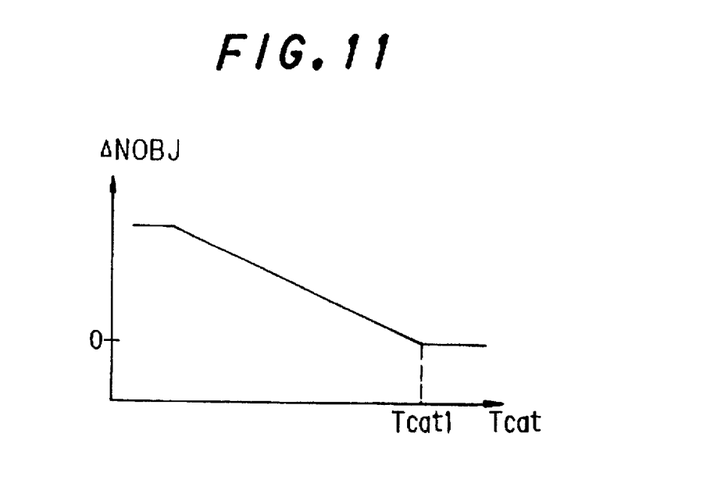
FIG. 11 is a graph showing the characteristics of the augmentative correction amount ΔNOBJ of the desired idle speed established with respect to the exhaust system ambient temperature Tcat and referred to in the flowchart of FIG. 2.

FIG. 11 shows the characteristics of the augmentative correction amount ΔNOBJ determined with respect to the exhaust system ambient temperature Tcat, which is stored in the memory 54c as a table to be retrieved by the detected exhaust system ambient temperature Tcat. The augmentative correction amount is determined to be decreased with increasing exhaust system ambient temperature and is made zero at a predetermined temperature Tcat1, as illustrated in the figure. The temperature Tcat1 is the same value as Tcat1 illustrated in FIG. 5 at which the current supply time TON is determined to be zero. From the relationship between the characteristics illustrated in FIGS. 5 and 11, the augmentative correction amount ΔNOBJ is set to be zero in S16 when the heater of the EHC 20 is not supplied with current.

In FIG. 2, the program moves to S18 in which the basic value of the desired engine speed NOBJM is added by the augmentative correction amount ΔNOBJ to determine the desired idle speed NOBJ. In this case, the desired engine speed equals the basic value. The program then goes to S20 in which the engine speed is controlled to the desired engine speed through the electro-magnetic valve 66. Since the control of this kind is known and the gist of the invention does not reside in that, no further explanation will be made.

On the other hand, when S14 finds that the EHC heater is supplied with current, the program proceeds to S22 in which it is checked if the program is looped for the first time since or after the decision in S14 was affirmative. If it is, the program goes to S24 in which the augmentative correction amount ΔNOBJ (initial value) is retrieved from the aforesaid table by the detected exhaust system ambient temperature Tcat, and to S18 in which the augmentative correction amount is added to the basic value to determine the desired value.

The decision in S22 will be negative from the next program loop and the program then goes to S26 in which the correction amount retrieved at the last program loop ΔNOBJn-1 is subtracted by a predetermined value ΔN and the resultant difference is determined to be the augmentative correction amount at the current program loop NOBJn, and to S18, S20. Here, n is a sample time in a discrete system, more specifically the time at which the program in FIG. 2 is looped. It should also be noted here that, for brevity and simplicity, the addition of "n" in the current value is omitted in the other steps in the flowchart.

The predetermined value ΔN is a value determined by dividing the correction amount ΔNOBJ (more precisely, the aforesaid initial value) by a quotient (obtained by dividing the current supply time TON by the program loop interval Tp). The above procedures are repeated each time it is confirmed in S14 that the EHC heater is supplied with current.

Figure 12:
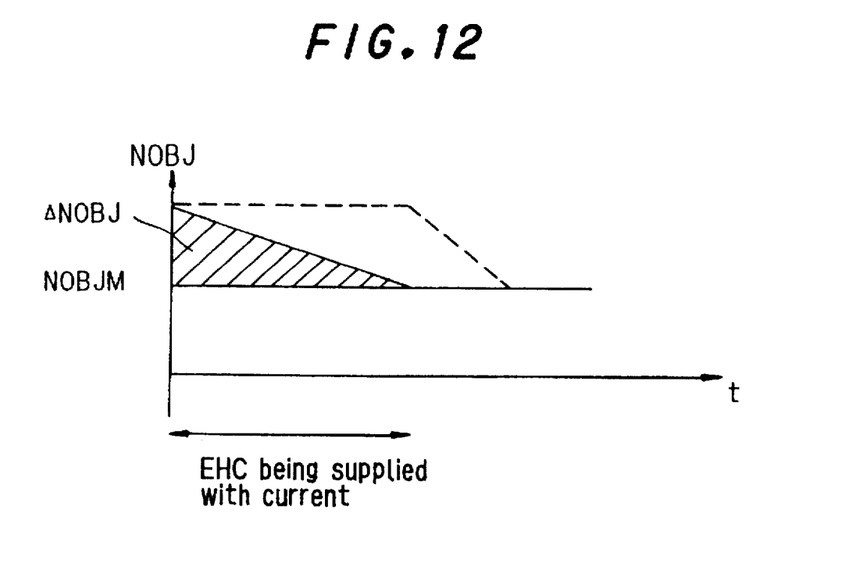
FIG. 12 is a graph showing the determination of the desired engine speed NOBJ in the system according to the invention.

FIG. 12 is a timing chart showing the determination of the desired engine speed NOBJ in the system according to the invention. As illustrated, the basic value NOBJM is increased by the augmentative correction amount ΔNOBJ in the higher direction upon the start of current supply to the EHC heater and then is gradually decreased by the predetermined value ΔN with respect to time. As stated above, the predetermined value ΔN is determined by dividing the initial value of the correction amount by the quotient obtained by TON/Tp such that the increase (augmentative correction amount) ΔNOBJ is decreased to zero upon the completion of the current supply to the EHC heater.

Since the system is configured such that the augmentative correction amount ΔNOBJ of the desired idle engine speed is based on the exhaust system ambient temperature Tcat, or more specifically, the basic value of the desired idle engine speed is determined based on the engine coolant temperature, while the amount of increase from the basic value is determined based on the exhaust system ambient temperature, generation of the required electric power is ensured, even in a situation where the engine is restarted shortly after it was stopped or some similar situations.

Moreover, since the current supply time TON is determined based on the parameters including the exhaust system ambient temperature Tcat, and the augmentative correction amount of the desired idle engine speed is decreased with increasing exhaust system ambient temperature, it becomes possible to optimally determine the augmentative correction engine speed under idle control.

Furthermore, since the predetermined value ΔN is determined by dividing the initial value of the correction amount by the quotient obtained by TON/Tp such that the increase (correction amount) ΔNOBJ is decreased to zero upon the completion of the current supply to the EHC heater, it becomes possible to determine the augmentative correction of the engine idle speed to the least necessary for ensuring that sufficient electric power is supplied to the EHC heater. In addition, since the augmentative correction amount is gradually decreased by ΔN, the desired engine idle speed does not change keenly at the end of the augmentative speed correction, with the result that no passenger feels an unpleasant shock.

It should be noted in the above that, although the retrieval of the correction amount ΔNOBJ from the table according to the characteristics shown in FIG. 11 is only made in the first program loop after the start of the current supply to the EHC heater and the amount is decreased by ΔN, it is alternatively possible to retrieve the correction amount each time the program is looped.

It should also be noted that, although the predetermined value is obtained by dividing the initial value of the augmentative correction amount by a quotient obtained by the current supply time by dividing by the program loop interval, it is alternatively possible to obtain the predetermined value in other manners. Further, the predetermined value may be a fixed value.

It should further be noted that the correction amount can by decreased gradually after the completion of the current supply to the EHC heater as illustrated by dashed lines in FIG. 12.

It should further be noted that, although the EHC heater is supplied with the electric power from the alternator 26, it is alternatively possible to supply the power from the battery 28, since the same problem arises when the battery voltage drops.

It should further be noted that, although the exhaust system ambient temperature Tcat is detected by a sensor, it is alternatively possible to detect the value through estimation as was disclosed in the assignee's Japanese Patent Application No. 7(1995)174,257 filed on Jun. 16, 1995 and filed in the United States on Jun. 14, 1996.

It should further be noted that, although the engine coolant temperature is detected, it is alternatively possible to use other parameters indicative of the temperature of the engine.

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A system for controlling an idle speed of an internal combustion engine, comprising:
   a catalytic converter installed in an exhaust system of the engine for reducing pollutants from exhaust gases emitted from the engine, the catalytic converter having a heater;
   a current supply circuit for supplying current to the heater of the catalytic converter;
   idling operation detecting means for detecting whether the engine is in an idling state;
   engine coolant temperature detecting means for detecting an engine coolant temperature of the engine;
   exhaust system ambient temperature detecting means for detecting an ambient temperature of the exhaust system of the engine;

desired idle speed determining means for determining a desired idle speed of the engine with respect to at least the engine coolant temperature when the engine is in the idling state;

desired idle speed increasing means for determining an augmentative correction amount based upon the exhaust system ambient temperature to increase the desired idle speed when the heater of the catalytic converter is supplied with current, wherein said desired idle speed increasing means determines the augmentative correction amount in such a manner that the augmentative correction amount decreases with increasing exhaust system ambient temperature; and engine speed control means for controlling a speed of the engine to the desired idle speed.

2. A system according to claim 1, further including;

an alternator driven by the engine to generate electric power; and a switch for connecting the alternator to the current supply circuit for supplying the current to the heater of the catalytic converter.

3. A system according to claim 1, wherein said desired idle speed increasing means determines a value and decreases the augmentative correction amount by the value with respect to time.

4. A system according to claim 3, wherein said desired idle speed increasing means determines the value and decreases the augmentative correction amount by the value with respect to time such that the amount becomes zero when the current supply to the heater of the catalytic converter is completed.

5. A method for controlling an idle speed of an internal combustion engine, having a catalytic converter installed in an exhaust system of the engine for reducing pollutants from exhaust gases emitted from the engine, the catalytic converter having a heater; and a current supply circuit for supplying current to the heater of the catalytic converter;

wherein the method comprises the steps of:
  (a) detecting whether the engine is in an idling state;
  (b) detecting an engine coolant temperature of the engine;
  (c) detecting an ambient temperature of the exhaust system of the engine;
  (d) determining a desired idle speed of the engine with respect to at least the engine coolant temperature when the engine is in the idling state;
  (e) determining an augmentative correction amount based upon the exhaust system ambient temperature to increase the desired idle speed when the heater of the catalytic converter is supplied with current, wherein the augmentative correction amount being determined in such a manner that the augmentative correction amount decreases with increasing exhaust system ambient temperature; and
  (f) controlling a speed of the engine to the desired idle speed.

6. A method according to claim 5, further including;

an alternator driven by the engine to generate electric power; and a switch for connecting the alternator to the current supply circuit for supplying the current to the heater of the catalytic converter.

7. A method according to claim 5, wherein said step (e) determines a value and decreases the augmentative correction amount by the value with respect to time.

8. A method according to claim 7, wherein said step (e) determines the value and decreases the augmentative correction amount by the value with respect to time such that the amount becomes zero when the current supply to the heater of the catalytic converter is completed.

9. A computer program for controlling an idle speed of an internal combustion engine, having a catalytic converter installed in an exhaust system of the engine for reducing pollutants from exhaust gases emitted from the engine, the catalytic converter having a heater;

a current supply circuit for supplying current to the heater of the catalytic converter;

wherein the computer program comprises the steps of:
  (a) detecting whether the engine is in an idling state;
  (b) detecting an engine coolant temperature of the engine;
  (c) detecting an ambient temperature of the exhaust system of the engine;
  (d) determining a desired idle speed of the engine with respect to at least the engine coolant temperature when the engine is in the idling state;
  (e) determining an augmentative correction amount based upon the exhaust system ambient temperature to increase the desired idle speed when the heater of the catalytic converter is supplied with current, wherein the augmentative correction amount being determined in such a manner that the augmentative correction amount decreases with increasing exhaust system ambient temperature; and
  (f) controlling a speed of the engine to the desired idle speed.

10. A computer program according to claim 9, further including;

an alternator driven by the engine to generate electric power; and a switch for connecting the alternator to the current supply circuit for supplying the current to the heater of the catalytic converter.

11. A computer program according to claim 9, wherein said step (e) determines a value and decreases the augmentative correction amount by the value with respect to time.

12. A computer program according to claim 11, wherein said step (e) determines the value and decreases the augmentative amount by the value with respect to time such that the amount becomes zero when the current supply to the heater of the catalytic converter is completed.

* * * * *